United States Patent
Bulgrin et al.

(10) Patent No.: US 7,448,850 B2
(45) Date of Patent: Nov. 11, 2008

(54) CLOSED LOOP, STEAM COOLED TURBINE SHROUD

(75) Inventors: Charles Alan Bulgrin, Greenville, SC (US); Iain Robertson Kellock, Simpsonville, SC (US); Stephen William Tesh, Simpsonville, SC (US); Tagir Nigmatulin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 308 days.

(21) Appl. No.: 11/278,972

(22) Filed: Apr. 7, 2006

(65) Prior Publication Data

US 2007/0237647 A1 Oct. 11, 2007

(51) Int. Cl.
F01D 5/30 (2006.01)

(52) U.S. Cl. .............. 415/173.1; 415/115; 415/173.2; 415/178; 415/200; 416/97 R

(58) Field of Classification Search .............. 415/115, 415/173.1, 173.4, 200, 176, 178; 416/97 R
See application file for complete search history.

(56) References Cited

U.S. PATENT DOCUMENTS

| 4,280,792 | A | * | 7/1981 | Hartel et al. ............. 415/117 |
| 4,481,237 | A | * | 11/1984 | Bosshart et al. .......... 427/376.4 |
| 5,375,973 | A | | 12/1994 | Sloop et al. |
| 5,391,052 | A | * | 2/1995 | Correia et al. ............. 415/115 |
| 5,486,090 | A | | 1/1996 | Thompson et al. |
| 5,538,393 | A | | 7/1996 | Thompson et al. |
| 6,390,769 | B1 | | 5/2002 | Burdgick et al. |
| 6,676,370 | B2 | * | 1/2004 | Tiemann ................... 415/116 |
| 6,905,302 | B2 | * | 6/2005 | Lee et al. .................. 415/115 |

* cited by examiner

Primary Examiner—Igor Kershteyn
(74) Attorney, Agent, or Firm—Sutherland Asbill & Brennan LLP

(57) ABSTRACT

A closed loop inner shroud assembly for a gas turbine. The shroud assembly may include a shroud body, a cover plate, an inlet though the cover plate to the shroud body, a serpentine passageway through the shroud body, and an outlet from the shroud body to the cover plate.

20 Claims, 2 Drawing Sheets

CLOSED LOOP, STEAM COOLED TURBINE SHROUD

TECHNICAL FIELD

The present application relates generally to the cooling of turbine shrouds and more particularly relates to a closed loop, steam cooled inner shroud of a gas turbine.

BACKGROUND OF THE INVENTION

The hot gases in a gas turbine often can be at a temperature higher than the melting point of the metal components. To contain the hot gas above the tips of the rotating turbine buckets, segmented cooled stationary shrouds are generally needed. It is therefore necessary to establish a cooling scheme to protect these components during operation.

Turbine shrouds often are cooled by conduction, impingement cooling, film cooling, or combinations thereof. One cooling scheme is shown in commonly owned U.S. Pat. No. 6,390,769. As is shown, this shroud uses a series of four impingement cooled chambers. Each chamber has an impingement baffle that is welded to the inner shroud casting. This arrangement provides a controlled path and distribution for the steam coolant to be sprayed onto the backside of the gas path wall, collected, and then repeated in each of the chambers. Although this method is effective for cooling, the shroud has numerous parts and accompanying manufacturing process steps. U.S. Pat. No. 6,390,769 is incorporated herein by reference.

Thus, there is a desire for an improved inner shroud that provides effective cooling with simplified manufacturing methods and techniques. The shroud should not reduce the overall efficiency of the turbine as a whole.

SUMMARY OF THE INVENTION

The present application thus describes a closed loop inner shroud assembly for a gas turbine. The shroud assembly may include a shroud body, a cover plate, an inlet though the cover plate to the shroud body, a serpentine passageway through the shroud body, and an outlet from the shroud body to the cover plate.

The shroud assembly further may include an inner coating applied to the shroud body. The inner coating may include a number of ceramic and metallic layers. The inner coating may include a thermal barrier coating for protecting the shroud body from direct exposure to hot gas and may include a plasma spray application.

The shroud body may include a single crystal superalloy metal or an equiax nickel based superalloy metal. The shroud body is made via an inner core cast. The shroud body may include steam inlet and exit cavities. The cover plate may include a cobalt-based alloy.

The serpentine passageway may include a number of turns of about ninety degrees. The serpentine passageway may include a predetermined size for a smooth and well distributed steam flow therein and also may include multiple parallel paths. The serpentine passageway may include a number of turbulators therein.

The present application further describes a closed loop inner shroud assembly for a gas turbine. The shroud assembly may include a shroud body, a cover plate, an inlet though the cover plate to the shroud body, and a serpentine passageway through the shroud body. The serpentine passageway may include a number of turns of about ninety degrees.

The serpentine passageway may include a predetermined size for a smooth and well distributed steam flow therein and also may include multiple parallel paths. The serpentine passageway may include a number of turbulators therein.

These and other features of the present application will become apparent to one of ordinary skill in the art upon review of the following detailed description when taken in conjunction with the drawings and the appended claims.

DETAILED DESCRIPTION

Figure 1:
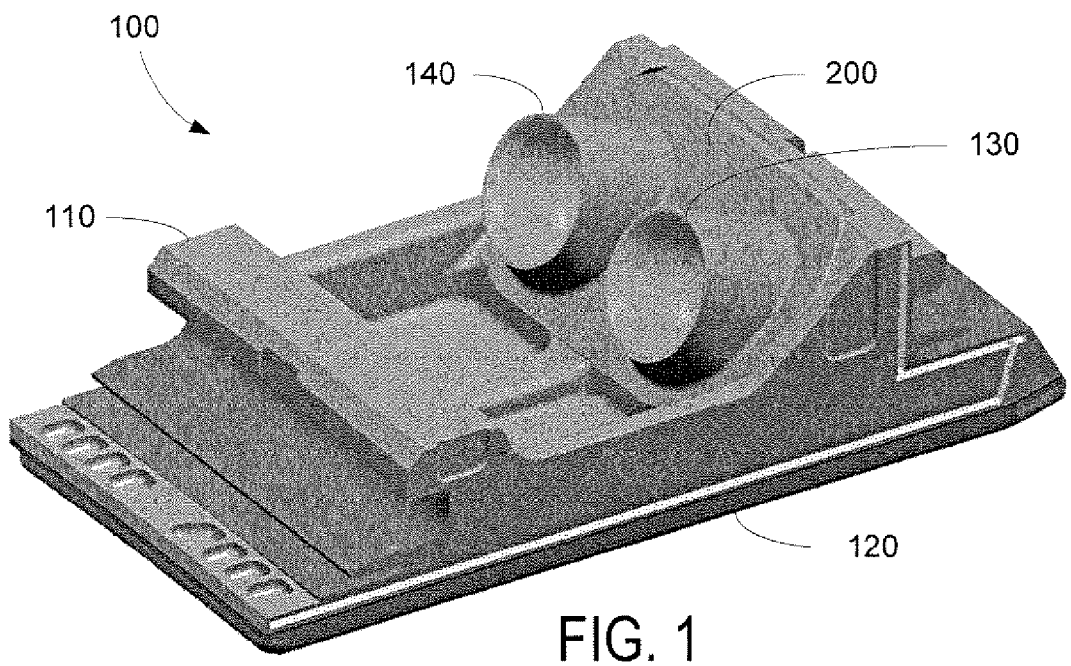
FIG. 1 shows a perspective view of a shroud assembly as is described herein.
Figure 2:
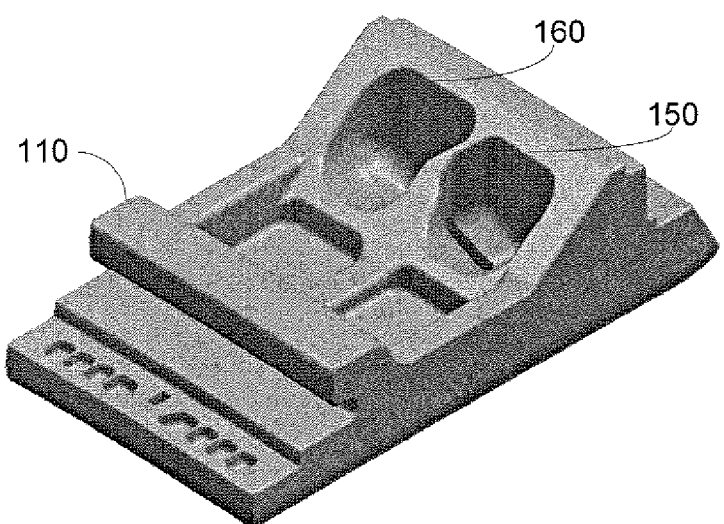
FIG. 2 is a perspective view of an inner shroud casting as used in the shroud assembly of FIG. 1
Figure 3:
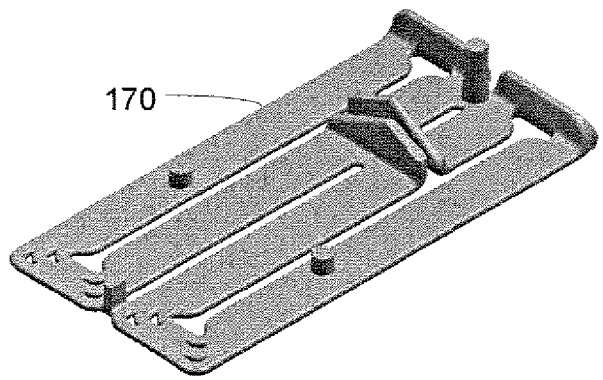
FIG. 3 is a perspective view of an inner core used to create the passage of the inner shroud casting of FIG. 2.
Figure 4:
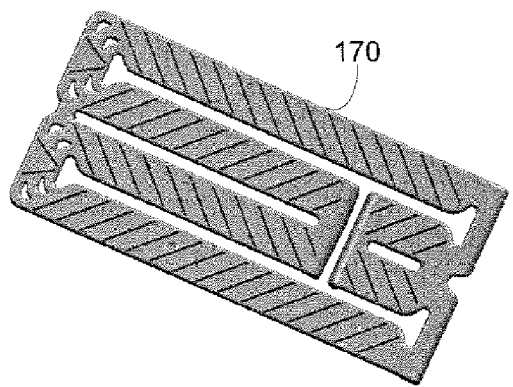
FIG. 4 is a perspective view of the underside of the inner core shown in FIG. 3.
Figure 5:
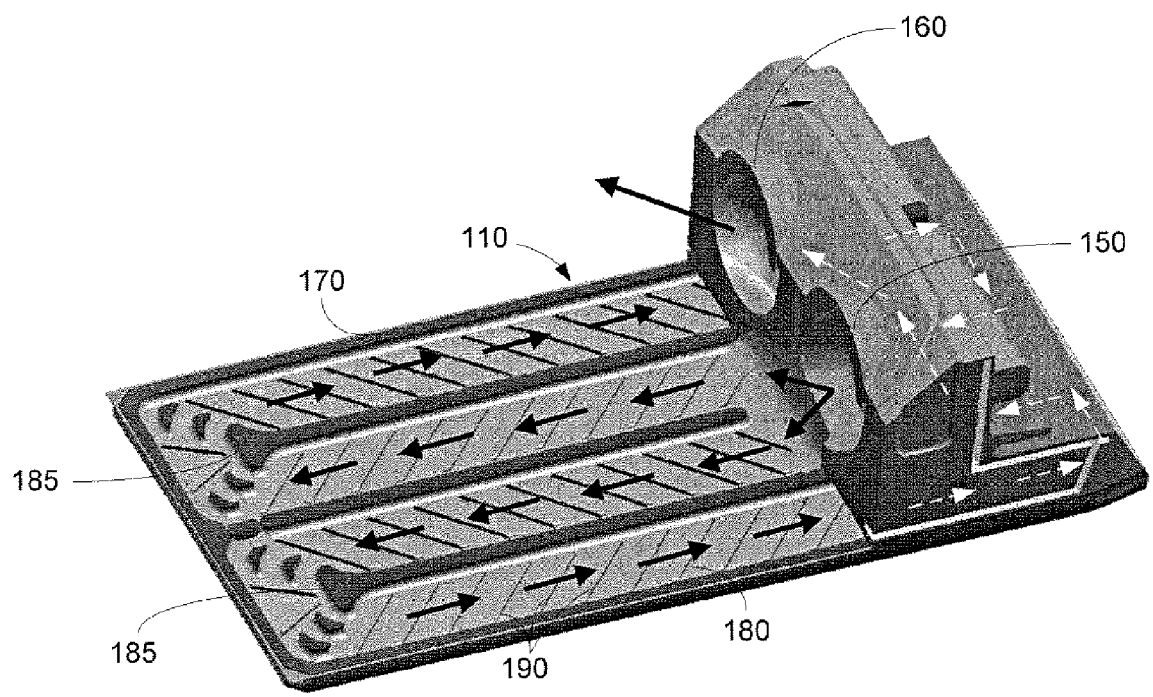
FIG. 5 is a cutaway perspective view of the shroud assembly of FIG. 1 showing the passage created by the ceramic core of FIGS. 3 and 4.

Referring now to the drawings, in which like numerals refer to like elements throughout the several views, FIG. 1 illustrates a shroud assembly 100 as is described herein. The shroud assembly 100 may be positioned about a conventional stage-one bucket or a similar type of forward turbine stage. The shroud assembly 100 may be associated with a turbine shell interface and a hook nozzle interface or an outer shroud housing (not shown). Although steam will be described as the cooling medium used herein, the shroud assembly 100 may be used with any type of cooling medium.

The shroud assembly 100 may include an inner shroud body 110, an inner coating 120, and a cover plate 200. The shroud body 110 may be made out of a single crystal superalloy metal, an equiax nickel based superalloy metal, or similar types of materials with good high temperature metallurgical properties. The shroud body 110 may be made via casting methods using a ceramic inner core 170 to create an inner flow path 180. The inner coating 120 may be made out of both ceramic and metallic layers, or similar types of materials that can withstand long durations in very high temperature environments and provide a thermal barrier between the shroud body 110 and the hot gas. The cover plate 200 may be made from superalloy metals that have superior wear characteristics such as cobalt-based alloys and may be made via casting methods or may be fully machined to shape. The shroud body 110 and the cover plate 200 may be joined via electron beam welding, brazing or by similar techniques. The inner coating 120 may be applied as a high temperature plasma spray. The use of the inner coating 120 is optional.

The cover plate 200 may include a steam inlet port 130 and a steam outlet port 140. Likewise, the shroud body 110 may include a steam inlet cavity 150 in communication with the steam inlet port 130 of the cover plate 200 and a steam outlet cavity 160 in communication with the steam outlet port 140 of the cover plate 200. The steam inlets and outlets 150, 160 of the shroud body 110 in turn lead to the inner flow path 180 cast integrally into the shroud body 110 using the ceramic inner core 170. As described above, the flow path 180 is formed therein after removing the ceramic inner core 170 as part of an investment casting process.

As is shown, the flow path 180 is largely in a serpentine shape and may include multiple parallel paths for the coolant to flow simultaneously. The flow path 180 has a number of about ninety-degree (90°) turns located at the forward and aft ends of the shroud body 110 so as to permit coolant to flow almost entirely to the forward and aft edges. These turns incorporate a number of turning vanes 185, which facilitate a smooth and well-distributed steam flow therethrough. The flow path 180 also may be sized to produce a high convection coefficient for the steam flowing therethrough and simultaneously to produce a compact passage height. Furthermore, this compact flow path 180 facilitates easily routing of the flow path forward and aft underneath the hooks without interference.

The flow path 180 may have a number of turbulators 190 positioned therein. Any number of turbulators 190 may be used. The turbulators 190 enhance the heat transfer characteristics of the steam coolant. The use of the turbulators 190 is optional.

In use, the steam inlet 130 and the steam outlet 140 of the cover plate 200 are centrally positioned in the shroud assembly 100 to avoid interference with the forward and aft hooks. The serpentine nature of the flow path 180 allows simultaneous forward and aft flow of the coolant over the central region of the shroud assembly 100 while also permitting the steam to be fed into and out of this same central region. The steam thus flows through the steam inlet port 130 of the cover plate 200, the steam inlet cavity 150 of the shroud body 110, through the flow path 180, and again out via the steam outlet cavity 160 and the steam outlet port 140 so as to provide convective cooling and no loss of steam. Testing has indicated that the shroud assembly 100 does not produce a significant loss in pressure during use while still provide effective convective cooling.

The shroud assembly 100 may be used with the forward stages of a gas turbine and combined with a means (such as a steam turbine) to extract work from the thermal energy imparted to the steam during cooling of the shroud. Subsequently this steam can be routed back to the shroud in a closed loop fashion to be used again as coolant. For example, the shroud assembly 100 may be used with a combined cycle 9H steam cooled turbine sold by General Electric Corporation of Schenectady, N.Y. or in similar types of devices.

It should be apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A closed loop inner shroud assembly for a gas turbine, comprising:
    a shroud body;
    a cover plate;
    a serpentine passageway defined through the shroud body and enclosed by the cover plate;
    an inlet through the cover plate to the serpentine passageway; and
    an outlet from the serpentine passageway through the cover plate.

2. The shroud assembly of claim 1, further comprising an inner coating applied to the shroud body.

3. The shroud assembly of claim 2, wherein the inner coating comprises a plurality of ceramic and metallic layers.

4. The shroud assembly of claim 2, wherein the inner coating comprises a thermal barrier coating for protecting the shroud body from direct exposure to hot gas.

5. The shroud assembly of claim 2, wherein the inner coating comprises a plasma spray application.

6. The shroud assembly of claim 1, wherein the shroud body comprises a single crystal superalloy metal or an equiax nickel based superalloy metal.

7. The shroud assembly of claim 6, wherein the shroud body is made via an inner core cast.

8. The shroud assembly of claim 1, wherein the shroud body comprises a steam inlet cavity and a steam outlet cavity.

9. The shroud assembly of claim 1, wherein the cover plate comprises a cobalt-based alloy.

10. The shroud assembly of claim 1, wherein the serpentine passageway comprises a plurality of turns of about ninety degrees.

11. The shroud assembly of claim 1, wherein the serpentine passageway comprises a predetermined size for a smooth and well distributed steam flow therein.

12. The shroud assembly of claim 1, wherein the serpentine passageway comprises a plurality of parallel paths.

13. The shroud assembly of claim 1, wherein the serpentine passageway comprises a plurality of turbulators therein.

14. A closed loop inner shroud assembly for a gas turbine, comprising:
    a shroud body;
    a cover plate;
    a serpentine passageway defined through the shroud body and enclosed by the cover plate; and
    an inlet through the cover plate to the serpentine passageway;
    wherein the serpentine passageway comprises a plurality of turns of about ninety degrees.

15. The shroud assembly of claim 14, wherein the serpentine passageway comprises a predetermined size for a smooth and well distributed steam flow therein.

16. The shroud assembly of claim 14, wherein the serpentine passageway comprises a plurality of parallel paths.

17. The shroud assembly of claim 14, wherein the serpentine passageway comprises a plurality of turbulators therein.

18. A closed loop inner shroud assembly for a gas turbine, comprising:
    a shroud body;
    a cover plate;
    a plurality of serpentine passageways defined through the shroud body and enclosed by the cover plate;
    a common inlet through the cover plate, the common inlet being in fluid communication with each of the serpentine passageways; and
    a common outlet through the cover plate, the common outlet being in fluid communication with each of the serpentine passageways.

19. The closed loop inner shroud assembly of claim 18, wherein:
    each serpentine passageway comprises:
        two substantially linear passageway portions,
        a turn connecting the two substantially linear passageway portions, and
    the serpentine passageways are oriented in the shroud body such that the substantially linear passageway portions are substantially aligned with each other and the turns are adjacent to each other.

20. The closed loop inner shroud assembly of claim 19, wherein:
    the common inlet and the common outlet are adjacent to each other; and
    the turns are located opposite from the common inlet and the common outlet.

* * * * *